UNITED STATES PATENT OFFICE.

VACUUM OIL COMPANY, OF ROCHESTER, NEW YORK, ASSIGNEE, BY MESNE ASSIGNMENTS, OF M. P. EWING, DECEASED.

IMPROVEMENT IN MATERIAL FOR LUBRICATING.

Specification forming part of Letters Patent No. 58,020, dated September 11, 1866; reissue No. 7,321, dated September 26, 1876; application filed January 29, 1876.

DIVISION A.

*To all whom it may concern:*

Be it known that M. P. EWING, late of Rochester, Monroe county, State of New York, now deceased, invented a new and useful Improvement in Residual Heavy Hydrocarbon-Oils, and the following is a full and exact description thereof:

The term "heavy hydrocarbon-oils" is well understood by the trade as signifying hydrocarbon-oils from which the naphthas and the illuminating-oils have been removed.

The gravity (Baumé) of the heavy hydrocarbon-oil is, therefore, lower than that of illuminating-oil—never, it is believed, exceeding 35°, and ranging from that down to 24°; whereas illuminating-oil ranges from 50° to 40°. The oil thus known as heavy hydrocarbon-oil has, in greater or less degree, certain oleaginous qualities which render it very useful for many purposes. It is obtained both as a distillate of crude petroleum or of bituminous coal, and as a residuum or reduction of crude petroleum.

When obtained as a distillate, it is accompanied by certain light oils of an offensive odor, generally attributed to decomposition produced at the high temperature required for vaporizing the heavy oil, the vapors of such decomposition going over with the proper vapors of the heavy oil, and all being condensed together.

When obtained as a residuum, or reduction of crude petroleum, the practice, up to the time of the said EWING'S invention, was to remove the naphthas and illuminating-oils by distillation under atmospheric pressure, by the use of direct fire applied to the still.

The high degree of heat required under these conditions for effecting the removal of the illuminating-oils made the interior surfaces of the vessel in which the distillation was conducted so hot that the residual or reduced oil remaining therein was, where it came in contact with such surfaces, burned or scorched, thereby producing a tarry substance having the character of lampblack, which substance, being diffused in the oil, was offensive and troublesome, and the same high temperature developed in the residuum volatile oils, or "light ends," which, by reason of their offensive odor, and their reduction of the fire-test which the residual oil would stand, were objectionable in the use of the residual oil.

By the use of vacuum distillation, particularly with the aid of steam, the vapors of the illuminating-oil are raised and carried over at a temperature, within the distilling vessel, very much lower than that required for the same effect when working under atmospheric pressure, so much lower that the vessel is not heated so hot as to scorch or burn the residual or reduced oil in the manner before mentioned; and the volatile oils, or light ends, are not, to any injurious extent, formed.

This process of removing naphthas and illuminating-oils from petroleum, by distillation under vacuum, leaving unburned heavy oil as a residuum or reduction, is described in the specification of the said EWING'S patent, granted September 11, 1866, No. 58,020, on which this application for reissue is based, (as is also described suitable apparatus for carrying out the process,) and forms one of the subjects of another division of reissue of said patent, which division is of the same date as this.

The present division relates to the new article of manufacture which results from the said process, said article being the heavy residuum left after distilling off the lighter portions.

Its characteristics are that it is a heavy hydrocarbon-oil, the residuum of petroleum from which the lighter oils have been evaporated, and is practically free from burned or scorched particles of the character before described, and from volatile oils or light ends.

It is thus, as an article of manufacture, a substantial improvement upon pre-existing residual heavy hydrocarbon-oils.

It is not intended to limit the present claim of invention to the product of precisely the same process hereinbefore described, as modifications thereof may be readily made embodying the same principle of distillation at low temperature, to which the obtaining of the product in question is due.

What is claimed herein as a new article of manufacture, the invention of the said M. P. EWING, is—

An unburned, residual, heavy hydrocarbon-oil, substantially as described.

In witness whereof we have hereunto set our names in the presence of the subscribing witnesses this 24th day of January, 1876.

VACUUM OIL COMPANY,
Per JOHN D. HELMER, *Prest.*
H. B. EVEREST,
*Secretary and Treasurer.*

Witnesses:
G. A. DAVIS,
C. M. EVEREST,
R. F. OSGOOD,
E. B. SCOTT.